(12) United States Patent
Drouart et al.

(10) Patent No.: US 6,477,864 B2
(45) Date of Patent: *Nov. 12, 2002

(54) METHOD OF PURIFYING NATURAL OR SYNTHETIC SILICA, AND APPLICATION THEREOF TO DEPOSITING PURIFIED NATURAL OR SYNTHETIC SILICA ON AN OPTICAL FIBER PREFORM

(75) Inventors: Alain Drouart, Nanterre (FR); Benoît Gouez, Acheres (FR); Yves Lumineau, Herblay (FR); Pierre Ripoche, Pithiviers (FR); Jean-Florent Campion, Bois-Colombes (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/035,146

(22) Filed: Mar. 5, 1998

(65) Prior Publication Data

US 2001/0001366 A1 May 24, 2001

(30) Foreign Application Priority Data

Mar. 6, 1997 (FR) .......................................... 97 03519

(51) Int. Cl.[7] .............................................. C03B 37/18
(52) U.S. Cl. ......................... 65/391; 65/397; 65/17.4; 65/30.1; 65/422; 65/426; 427/452; 427/446
(58) Field of Search .............................. 427/452, 446; 65/391, 397, 422, 426, 17.4, 30.1

(56) References Cited

U.S. PATENT DOCUMENTS

| 3,128,166 A | 4/1964 | Mohn ............................ 65/18 |
| 3,361,525 A | 1/1968 | Rycke et al. |
| 4,048,348 A * | 9/1977 | Bailey et al. |
| 4,145,187 A | 3/1979 | Oliver et al. |
| 4,221,825 A * | 9/1980 | Guerder et al. |
| 4,265,649 A | 5/1981 | Achener ........................ 65/18 |
| 4,402,720 A | 9/1983 | Edahiro et al. |
| 4,983,370 A | 1/1991 | Loritsch et al. |
| 6,269,663 B1 * | 8/2001 | Drouart et al. ............... 65/391 |

FOREIGN PATENT DOCUMENTS

| DE | 32 06 180 | 8/1983 |
| DE | 3434598 A1 | 3/1986 |
| EP | 0 360 479 A2 | 3/1990 |
| EP | 0 578 553 | 1/1994 |
| EP | 0 658 520 | 6/1995 |
| EP | 0 863 108 | 9/1998 |
| FR | 2 446 264 | 8/1980 |
| GB | 2 134 896 | 8/1984 |

OTHER PUBLICATIONS

M. Carratt and S. Walker, "MCVD–Plasma Process for Manufacturing Single–mode Optical Fibers for Terrestrial Applications", 1225 Electrical Communication, 1$^{st}$ Quarter 1994, pp. 11–14.

* cited by examiner

Primary Examiner—James Derrington
(74) Attorney, Agent, or Firm—Sughrue Mion, PLLC

(57) ABSTRACT

Natural or synthetic silica is deposited on a preform set into rotation in front of a plasma torch which moves back and forth substantially parallel to a longitudinal direction of the preform, a first feed duct feeds the plasma with grains of natural or synthetic silica while a second feed duct feeds the plasma with a fluorine or chlorine compound, preferably a fluorine compound, mixed with a carrier gas. Any sodium or lithium contained in the grains of natural or synthetic silica react with the fluorine or chlorine of the fluorine or chlorine compound, thereby making it possible to improve the optical quality of fibers drawn from a preform built up with natural or synthetic silica, and to do so at reduced cost.

4 Claims, 1 Drawing Sheet

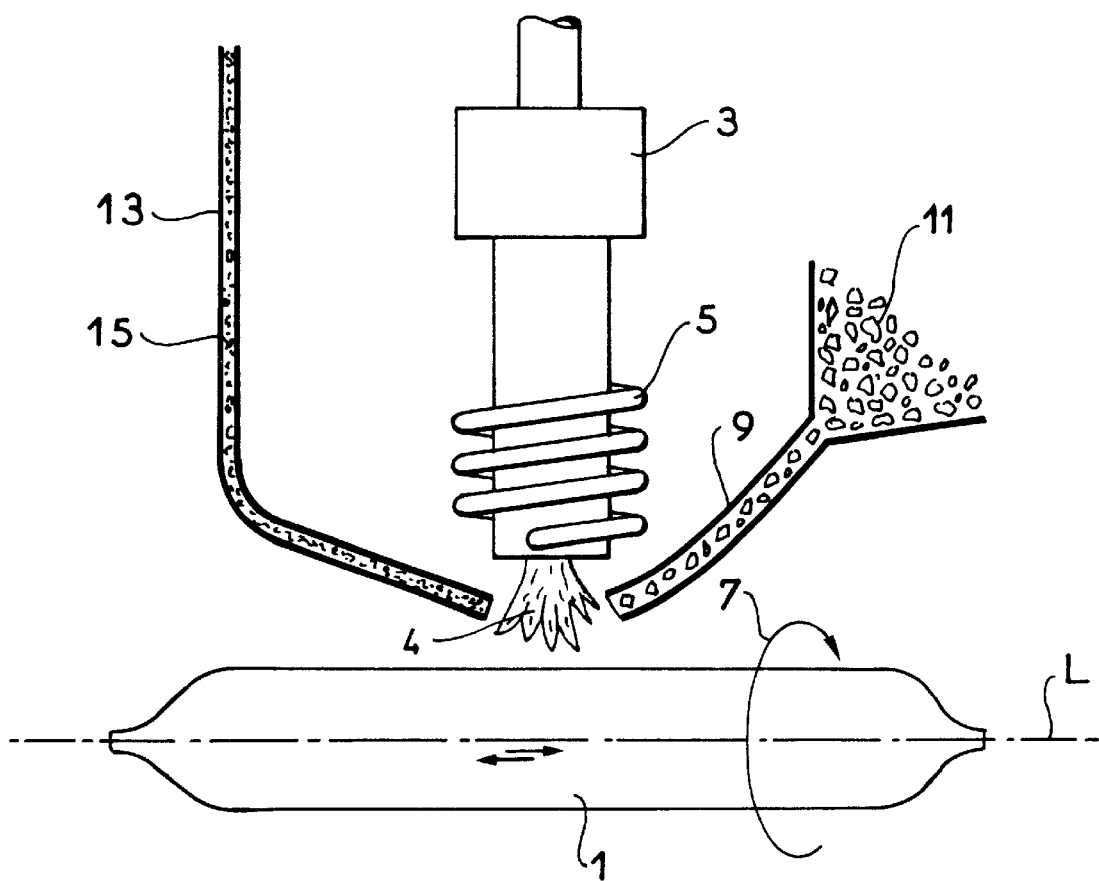

METHOD OF PURIFYING NATURAL OR SYNTHETIC SILICA, AND APPLICATION THEREOF TO DEPOSITING PURIFIED NATURAL OR SYNTHETIC SILICA ON AN OPTICAL FIBER PREFORM

The invention relates to a method of purifying natural or synthetic silica, and to applying said method to depositing purified natural or synthetic silica on an optical fiber preform, in which a substantially-cylindrical preform that extends in a longitudinal direction is set into rotation about its axis in front of a plasma or a flame which moves back and forth substantially parallel to the longitudinal direction of the preform, and in which a first feed duct feeds grains of natural or synthetic silica to the plasma or the flame.

BACKGROUND OF THE INVENTION

In known manner, a preform is obtained by chemical vapor deposition implemented inside a tube mounted on a glassmaker's lathe, and which is subjected to a collapsing operation to form a solid preform.

For multimode fibers, that way of making preforms suffices. However, for monomode fibers it is advantageous to add material, generally natural or synthetic silica, to the preform in order to increase its diameter and thus obtain, during fiber drawing, a continuous fiber that is several tens of kilometers long.

Material is added to the preform by means of a plasma torch. The preform is cylindrical in shape and it is set into rotation about its axis in front of the torch whose plasma is fed with grains of silica. The grains are melted and then deposited and vitrified on the preform. A plurality of passes are performed to build up to the desired diameter.

Depositing natural or synthetic silica suffers from a major drawback. Alkali elements such as sodium or lithium are present in non-negligible quantities in this type-of material, and they are present in the deposited grains, thereby encouraging the formation of bonds between the OH group and the dopant elements, such as germanium (Ge). Such bonds are absorbent at certain wavelengths, thereby increasing the attenuation losses of the optical fiber at said wavelengths.

OBJECT AND SUMMARY OF THE INVENTION

The object of the invention is to provide a method of purifying natural or synthetic silica.

To this end, the invention provides a method of purifying natural or synthetic silica in which a plasma or a flame from a heat energy supply means is fed by a first feed duct with grains of natural or synthetic silica, wherein a second feed duct feeds the plasma or flame with a fluorine or chlorine compound (preferably a fluorine compound) mixed with a carrier gas, the feed conditions of the two ducts are adjusted to cause alkali or alkaline-earth elements contained in the natural or synthetic silica grains to react with the fluorine or the chlorine (preferably the fluorine) of the fluorine or chlorine compound (preferably a fluorine compound).

The object of the invention is also to apply the method of purifying natural or synthetic silica to depositing natural or synthetic silica on an optical fiber preform, the deposit containing only a very small quantity of alkali or alkaline-earth elements.

To this end, the invention also provides a method of depositing natural or synthetic silica on an optical fiber preform, in which a substantially cylindrical preform extending in a longitudinal direction is set into rotation about its axis in front of a plasma or flame coming from a heat energy supply means which moves back and forth substantially parallel to the longitudinal direction of the preform, and in which a first feed duct feeds the plasma or the flame with grains of natural or synthetic silica, wherein a second feed duct feeds the plasma or flame with a fluorine or chlorine compound (preferably a fluorine compound) mixed with a carrier gas, the feed conditions of the two ducts being adjusted to cause alkali or alkaline-earth elements contained in the grains of natural or synthetic silica to react with the fluorine or the chlorine (preferably the fluorine) of the fluorine or chlorine compound (preferably a fluorine compound).

The plasma or flame is the seat of a chemical reaction in which the molten silica grains react with the fluorine or chlorine compound of the carrier gas. Advantageously, the temperature of the plasma can be adjusted to obtain high efficiency in the reaction, given the feed rates of the ducts feeding the carrier gas and for feeding the natural or synthetic silica. A higher temperature makes it possible to maintain good reaction efficiency while increasing the feed rates of the feed ducts.

Also advantageously, it is possible to adjust the content of the fluorine or chlorine compound (preferably a fluorine compound) in the carrier gas as a function of the mean size of the natural or synthetic silica grains. Smaller grains make it possible to maintain good reaction efficiency with a carrier gas that is less rich in the fluorine or chlorine compound (preferably a fluorine compound).

By eliminating alkaline elements from the deposit of natural or synthetic silica, it is possible to build up the optical fiber silica preform using a starting material that is much less expensive, particularly when natural silica is used, given that very high purity synthetic silica is five to ten times more expensive. The extra cost due to the chemical treatment remains small in proportion. The quality of optical transmission provided by the fiber obtained from the preform built up with natural or synthetic silica that has been treated by a fluorine or chlorine compound (preferably with a fluorine compound) is comparable with that of a fiber obtained by building up using very high purity synthetic silica, and is better than that of a fiber obtained from a preform that has been built up with natural or synthetic silica but not treated with a fluorine or chlorine compound.

BRIEF DESCRIPTION OF THE DRAWING

Other characteristics and advantages of the invention will appear on reading the following description of an example illustrated by the sole FIGURE which shows diagrammatically the items implemented when applying the method of purifying natural or synthetic silica during deposition on an optical fiber preform.

MORE DETAILED DESCRIPTION

The method of purifying natural or synthetic silica makes it possible to deposit one or more layers of natural or synthetic silica on an optical fiber preform and that contain only negligible amounts of alkali elements such as sodium or lithium, or of alkaline-earth elements. The deposition operation, also known as a building-up operation, serves to increase the diameter of a preform, to enable a continuous fiber to be drawn therefrom that is several tens of kilometers long.

In the FIGURE, the method comprises a plasma torch 3 including electrical inductor components 5. A preform 1 in the form of a cylinder extends in a longitudinal direction L and is caused to rotate about its axis as indicated by arrow 7. The plasma torch 3 moves back and forth substantially parallel to the longitudinal direction L of the preform. The preform is rotated by a glassmaker's lathe (not shown). The chucks of the lathe drive two glass rods which are welded to the two ends of the preform. The lathe is placed in an enclosed box that provides protection against electromagnetic radiation and against gaseous discharges from the chemical reaction.

A first feed duct 9 delivers grains of natural or synthetic silica 11 to the plasma. These grains are the result, for example, of grinding up coarse blocks of natural quartz or rock crystal. The feed is performed merely by gravity. A valve (not shown) is placed outside the box to allow the feed rate to be adjusted.

A second feed duct 13 feeds the plasma with a gas 15 that conveys a given content of a fluorine or chlorine compound, and preferably of a fluorine compound. The carrier gas is preferably air. The fluorine compound is, for example, sulfur hexafluoride $SF_6$, or a Freon selected from those authorized under European regulations, such as $C_2F_6$. The chlorine compound may be chlorine gas $Cl_2$, for example. A valve connected to a gas supply placed outside the box serves to adjust the carrier gas flow rate. Another valve connected to the gas supply serves to adjust the content of fluorine or chlorine compound in the carrier gas. The carrier gas may be constituted solely by the fluorine or chlorine compound, preferably a fluorine compound, in the pure state.

The plasma is the seat of the chemical reaction between the natural or synthetic silica grains and the flourine or cholorine, preferably flourine compound. The temperaure of the plasma lies in the range of 5000° C. to 10,000° C., causing the natural or synthetic silica grains to melt. The flourine of chlorine compounds react with the alkali elements such as sodium or lithium that are present in the present in the natural or synthetic silica, causing the flourides NaF or LiF or the chlorides NaCl or LiCl to be given off in gaseous form.

Good reaction efficiency is obtained under the following operating conditions:

| | |
|---|---|
| plasma power | 40 kW to 100 kW |
| natural or synthetic silica flow rate | 0.2 kg/h to 5 kg/h |
| average grain size | 50 μm to 600 μm |
| carrier gas flow rate | 0 to 15 liters/mm |
| fluorine compound content in carrier gas | 0.3% to 100% |

In the above example, the choice of a plasma torch does not restrict the generality of the method which can also be implemented by any other means for delivering heat energy and creating a temperature greater than 1,000° C., and in particular by means of a flame from a combustion device.

What is claimed is:

1. A method of depositing natural or synthetic silica on an optical fiber preform, in which a substantially cylindrical preform extending in a longitudinal direction is set into rotation about its axis in front of a plasma coming from a heat energy supply source which moves back and forth substantially parallel to the longitudinal direction of the preform, and in which a first feed duct feeds the plasma with grains of natural or synthetic silica, wherein a second feed duct positioned entirely external to the heat energy supply source feeds the plasma with a flourine or chlorine compound mixed with a carrier gas, the grains of natural or synthetic silica and the flourine or chlorine compound both being supplied externally and directly to the plasma at an end of the heat energy supply source, the feed conditions of the two ducts being adjusted to cause alkali or alkaline-earth elements contained in the grains of natural or synthetic silica to react with the flourine or the chlorine of the flourine or chlorine compound, causing flourides or chlorides to be given off in gaseous form.

2. The method according to claim 1, wherein the fluorine or chlorine compound is a fluorine compound.

3. The method according to claim 1, in which the plasma is at a temperature greater than 5000° C.

4. The method according to claim 1, wherein the grains of natural or synthetic silica fed by the first duct have an average grain size of 50 μm to 600 μm.

\* \* \* \* \*